(12) United States Patent
Garside

(10) Patent No.: US 8,898,733 B2
(45) Date of Patent: Nov. 25, 2014

(54) SYSTEM SECURITY PROCESS METHOD AND PROPERTIES OF HUMAN AUTHORIZATION MECHANISM

(75) Inventor: Debbie Garside, Bethesda (GB)

(73) Assignee: GeoLang Limited, Wales (GB)

( * ) Notice: Subject to any disclaimer, the term of this patent is extended or adjusted under 35 U.S.C. 154(b) by 148 days.

(21) Appl. No.: 13/577,650

(22) PCT Filed: Feb. 8, 2011

(86) PCT No.: PCT/EP2011/000558
§ 371 (c)(1),
(2), (4) Date: Aug. 7, 2012

(87) PCT Pub. No.: WO2011/098242
PCT Pub. Date: Aug. 18, 2011

(65) Prior Publication Data
US 2013/0014214 A1  Jan. 10, 2013

(30) Foreign Application Priority Data
Feb. 9, 2010  (GB) .................................. 1002068.3

(51) Int. Cl.
| | | |
|---|---|---|
| G06F 7/04 | (2006.01) | |
| G06F 21/57 | (2013.01) | |
| H04L 29/06 | (2006.01) | |
| G06F 21/36 | (2013.01) | |

(52) U.S. Cl.
CPC ........ G06F 21/57 (2013.01); *G06F 2221/2153* (2013.01); *G06F 2221/2103* (2013.01); *G06F 2221/2149* (2013.01); H04L 63/083 (2013.01); G06F 21/36 (2013.01)
USPC .................................. 726/2; 713/182; 726/22

(58) Field of Classification Search
CPC ......... G06F 21/31; H04L 63/08; H04L 63/02; G06Q 30/0277
USPC .................................. 713/182; 726/2, 22, 27
See application file for complete search history.

(56) References Cited

U.S. PATENT DOCUMENTS

| | | | | |
|---|---|---|---|---|
| 7,337,324 B2 * | 2/2008 | Benaloh et al. | ................ | 713/182 |
| 8,433,916 B2 * | 4/2013 | Kohavi | ......................... | 713/182 |
| 8,543,930 B2 * | 9/2013 | Champion et al. | ............ | 715/757 |

* cited by examiner

*Primary Examiner* — Fikremariam A Yalew
(74) *Attorney, Agent, or Firm* — Kang S. Lim

(57) ABSTRACT

A system and method for automatically determining if a computer user is a human or an automated script. Human interactive proofs (HIPs) are currently used to deter automated registration for web services by automated computer scripts. Unfortunately, while every endeavor is made to obscure the HIPs from such automated processes, the presentation of current HIPs leaves systems very much open to malicious attack from automated computer scripts and processes such as optical character readers (OCR). Those HIPs that have proven more successful in foiling malicious attacks have proved difficult for humans to decipher. The system and method of the invention in one embodiment provides a Pseudo-Isochromatic challenge or puzzle or any other visual illusion generated on the basis of Pseudo-Isochromatic imagery (PICPVI), to be employed within a challenge generator, the invention is created in such a way as to make it extremely difficult for an automated process to read, decipher or otherwise interpret the PICPVI but relatively easy for the human end user to successfully complete. In one embodiment the end user issues a request to a service provider for access to services, the service provider requests HIP by generating a PICPVI. The PICPVI is generated for the user and the response can be provided as the whole or part of the access to service request, making it extremely difficult for an automated process to access services unlawfully or maliciously.

35 Claims, 6 Drawing Sheets

System Security Process Properties of Human Authorization Mechanism

System Security Process Properties of Human Authorization Mechanism

Example Pseudo-Isochromatic Fills

SYSTEM SECURITY PROCESS METHOD AND PROPERTIES OF HUMAN AUTHORIZATION MECHANISM

CROSS-REFERENCE TO RELATED APPLICATIONS

The present application is a United States National Stage entry under 35 U.S.C. §371 of International Application No. PCT/EP2011/000558, filed Feb. 8, 2011, designating the United States of America and published in English on Aug. 18, 2011, which in turn claims priority to Great Britain Application No. 1002068.3, filed Feb. 9, 2010, each of which is incorporated herein by reference in its entirety.

TECHNICAL

This invention is directed toward a system and method for determining whether a computer user is a human or a computer program. More specifically, the invention is directed toward a system and method for devising a human answerable challenge or puzzle or any other visual illusion using Pseudo-Isochromatic visual techniques that is easy for the human to solve and extremely difficult for automated processes to solve.

BACKGROUND ART

In today's society the internet plays an important role in everyday life. Uses include: email, online shopping, banking, research using search engines and more recently cloud computing technologies for archiving, data manipulation and storage. Whilst the majority of internet users are law abiding citizens there is a minority of users who would access services or computer networks for unlawful or malicious reasons. Computer programs and applications are generally devised in order to provide services to the end user. However, some computer programs are devised with malicious intentions. It is these computer programs that are designed to gain access to private services and network services for the purpose of performing malicious tasks: these tasks include: signing up for multiple email accounts for spamming and phishing purposes, delivering viruses to insecure systems and networks to mention a few or even gaining control of protected systems such as oil, gas and electricity facilities. To this end network administrators and online internet service providers have devised a number of measures to secure their services. One such way is to provide a method to ascertain whether a request for service is human or computer generated—Human Interactive Proof (HIP).

There are many methods currently available but this method focuses on what we will call the challenge or puzzle or any other visual illusion method. Challenge is used throughout the document for ease of readability, but is meant to cover all the above in any permutation. This is where the end user, who may wish to access a network service or invoke a secure system change, is presented with a visual challenge or puzzle designed to be virtually indiscernible by a computer process or optical character recognition (OCR) process or other automated process or script.

Currently, there are various methods for generating what are known within the industry as CAPTCHAs (Completely Automated Public Turing test to tell Computers and Humans Apart). These generally involve skewing alphanumeric characters or obscuring the characters with lines to make it more difficult for optical character recognition (OCR) and other applications to read, decipher or otherwise interpret and complete the challenge or puzzle. One of the difficulties with these methods is that the challenge is often so obscured that not even the human user can complete it and yet the automated processes often complete them with ease. Many fortune 500 companies have had their systems breached due to an inability to make HIPS that are inaccessible to automated process—or at the very least inaccessible without spending an inordinate amount of time trying to crack the system.

Automated processes currently use a variety of techniques to read, decipher or otherwise interpret challenges and these include: image edge and boundary detectors, pixel analysis based on colour and position, erode and dilate techniques where the automated script erodes the background data and any occlusions, lines and noise and then dilates the remaining image pixels according to brightness and colour or relating pixels, as well as OCR processes. These processes rely upon the detection of shapes, segmentation, blocks of colour and a matching process. Other more sophisticated methods involve training neural networks to recognize skewed characters once extracted.

SUMMARY

This invention is designed to facilitate the automatic generation of challenges and puzzles in such a form as to be extremely difficult for automated processes, such as those mentioned, to access and complete but completely visually comprehensible to the human user. The invention is a method for generating challenges using what is known within the visual perception field as Pseudo-Isochromatic techniques—where objects, images and alphanumeric characters are comprised of a number of coloured dots or shapes presented on a background of similar shapes but in different colours and hues. These techniques were originally devised to test for colour deficiency within humans and were first used in 1873.

The Pseudo-Isochromatic challenge or puzzle or any other visual illusion generated on the basis of Pseudo-Isochromatic imagery (PICPVI) may be rendered as a challenge in either greyscale or various hues and saturations. Because up to 8% of the population is colour blind the invention will, if required, support a two tier challenge process where if the first challenge is not completed a secondary challenge is presented that incorporates a number (unlimited) of PICPVIs. By way of an example, the end user is prompted to complete challenge 1 AND/OR challenge 2 AND/OR challenge 3 within the secondary challenge feature. Secondary challenges may take one or any number of the following forms of Vanishing PICPVI, Qualitative PICPVI, Transformation PICPVI, or Hidden PICPVIs which will take into account confusion lines which relate to the colours that may be confused by Dichromats (or those with colour deficiencies); Hidden PICPVIs are those that may not be seen by Trichromats (those with normal colour vision) but are generally seen by Dichromats. Vanishing PICPVIs are discernible by Trichromats but not Dichromats. The purpose of this is so that the PICPVIs are designed to allow for all types of humans: Trichromats who have normal vision, Dichromats who are colour blind and who can be further defined as: protanopes who have a lack of red cones within their visual system, deuternopes who have a lack of green cones, tritanopes who have a lack of blue cones and anomalous trichromats who have a partial loss of any of the colour cones of the human visual system. The Qualitative PICPVI is discernible by both protanopes and deuternopes but with different answers.

The invention is based on these principles and the principle that seemingly random sized shapes presented on similar backgrounds in different hues can build an image visible to the human eye but extremely difficult for automated processes to interpret. In other words a human visible illusion. It is possible to create a PICPVI that will be visible for all humans no matter what their colour vision abilities. This is defined within the context of this invention as a Transformation PICPVI; whereby a Trichromat will see one PICPVI and a Dichromat will see another PICPVI within one PICPVI as presented.

The invention is designed to be incorporated, under license, within a standalone software as a service system or within, or used in conjunction with, other systems which may also offer alternative methods for completing challenges and puzzles such as those that are suitable for the visually impaired e.g. auditory systems. The invention may also be used to ascertain a suitable colour scheme for presenting digital information to the end user on end user equipment and automating such schemes e.g. colour schemes on web sites.

The invention is directed toward, but not limited to, a system and method for determining if a computer user is a human or a computer program such as an automated script by generating and solving a PICPVI. The system and method of the invention does not require a user to interact with a service provider in order to obtain and answer a challenge but may be incorporated within a variety of systems under license either locally or on a network service. Thus, the embodiments of the system and method according to the invention are advantageous in that they may be utilised within a variety of systems.

In general, in one embodiment of the invention, a computer user's computing device is equipped with a trusted computing environment or device consisting of a challenge generator. The PICPVI is generated for the user by the user's trusted computing environment or device, and the user answers the challenge. Authentication, such as digital signature or any other form of authentication such as hash keys may be included which may or may not include the user's answer, or may be appended to the user's answer or may be provided as part of the user's service request to a service provider to access their services. For example, authentication can be appended to the message body (which may include such things as the correct answer, timestamp, request for services, and so on) to prove the authenticity and integrity of the message to the service provider. Such a signed assertion or signed message created by the trusted computing environment or device, or trusted third party in the case where one is employed, proves to the service providers that the user has completed the PICPVI. This obviates the need for a separate challenge to be generated and sent from the service provider and the user's response to that challenge being sent back to the service provider. It also significantly reduces the burden on the service provider. The invention is not limited to this scenario and the PICPVI may be generated by either end user, service provider or a trusted third party service.

More specifically, in one embodiment of the system and method according to the invention, a user wishing to request a particular service creates its own PICPVI using its trusted computing device or environment which may be set up for the end users particular colour vision deficiencies if required. The user then answers the PICPVI and the trusted computing environment evaluates the user's answer to the challenge. The trusted computing environment generates an authentication process such as a digital signature or any other form of authentication (e.g., a signed assertion) attesting to the user's successful completion of the challenge which is attached to the user's request for services and sent to the service provider. Once the service provider receives the user's message, the form of authentication used, such as a digital signature or hash key or any other form of authentication, can then be verified by the service provider. If the form of authentication is acceptable, the service provider processes the user's request for services and provides the user access to their services. Access to these services could include, but are not limited to those, by way of example, assigning an email account, validating an input in a poll, allowing use of a search engine, allowing use of a chat room, and allowing access to data on a website or allowing a computer program to access secure data or systems setup within the trusted computer environment.

In another embodiment similar to the one described above, the form of authentication, such as a digital signature or any form of authentication or signed assertion generated by the user's trusted computing environment, includes the user's answer to the PICPVI, while not determining if the user's answer is correct or not. In this case, when the user's request for service message is sent to the service provider, the method of authentication, such as the digital signature or any other form of authentication includes the user's answer, or the user's answer is appended to the form of authentication, such as a digital signature or any alternative forms of authentication, and the service provider makes the determination as to whether the user's answer to the challenge is correct or not. This determination is made by the service provider using the same secret key as was used by the user's trusted environment to generate the PICPVI. In this embodiment it is preferable if the message to the service provider (including the method of authentication such as a digital signature, hash key or any alternative form of authentication) is encrypted. Otherwise it would be possible for the user to read the answer to the challenge from the signature or signed assertion. It should be noted that in any one of the embodiments disclosed herein a keyed hash, or any other form of authentication can be used as an alternative to a digital signature. A keyed hash (a hash in which one of the inputs is a secret key) requires the authenticator to share a secret key with the entity being authenticated, so a digital signature is sometimes preferred.

A variant of the embodiment discussed in the paragraph above can be exemplified in an embodiment that employs the user's trusted computing environment to digitally sign an assertion for any message that it is given, but to report back to the user only a partial authentication, such as a partial digital signature or other form of partial authentication. The missing portion of the signature is then rendered as a PICPVI whose answer, when combined with the given portion of the signature, forms a complete signature. In yet other alternate embodiments of the system and method according to the invention discussed above, the user's trusted computing environment is replaced with a trusted third party or the service provider itself. In these embodiments, the trusted third party or service provider performs the functions of the user's trusted computing environment and issues the PICPVI.

In addition to the just described benefits, other advantages of the present invention will become apparent from the detailed description which follows hereinafter when taken in conjunction with the drawing figures which accompany it.

The specific features, aspects, and advantages of the invention will become better understood with regard to the following description, appended claims, and accompanying drawings where:

DETAILED DESCRIPTION OF SOME EMBODIMENTS

In the following description of embodiments of the invention, reference is made to the accompanying drawings that form a part hereof, and in which is shown by way of illustration specific embodiments in which the invention may be practiced. It is understood that other embodiments may be utilized and structural changes may be made without departing from the scope of the present invention. In particular, hand-held and mobile devices, whilst not depicted, are within the scope of what is determined as general computing devices.

1.0 Exemplary Operating Environment

Figure 1:
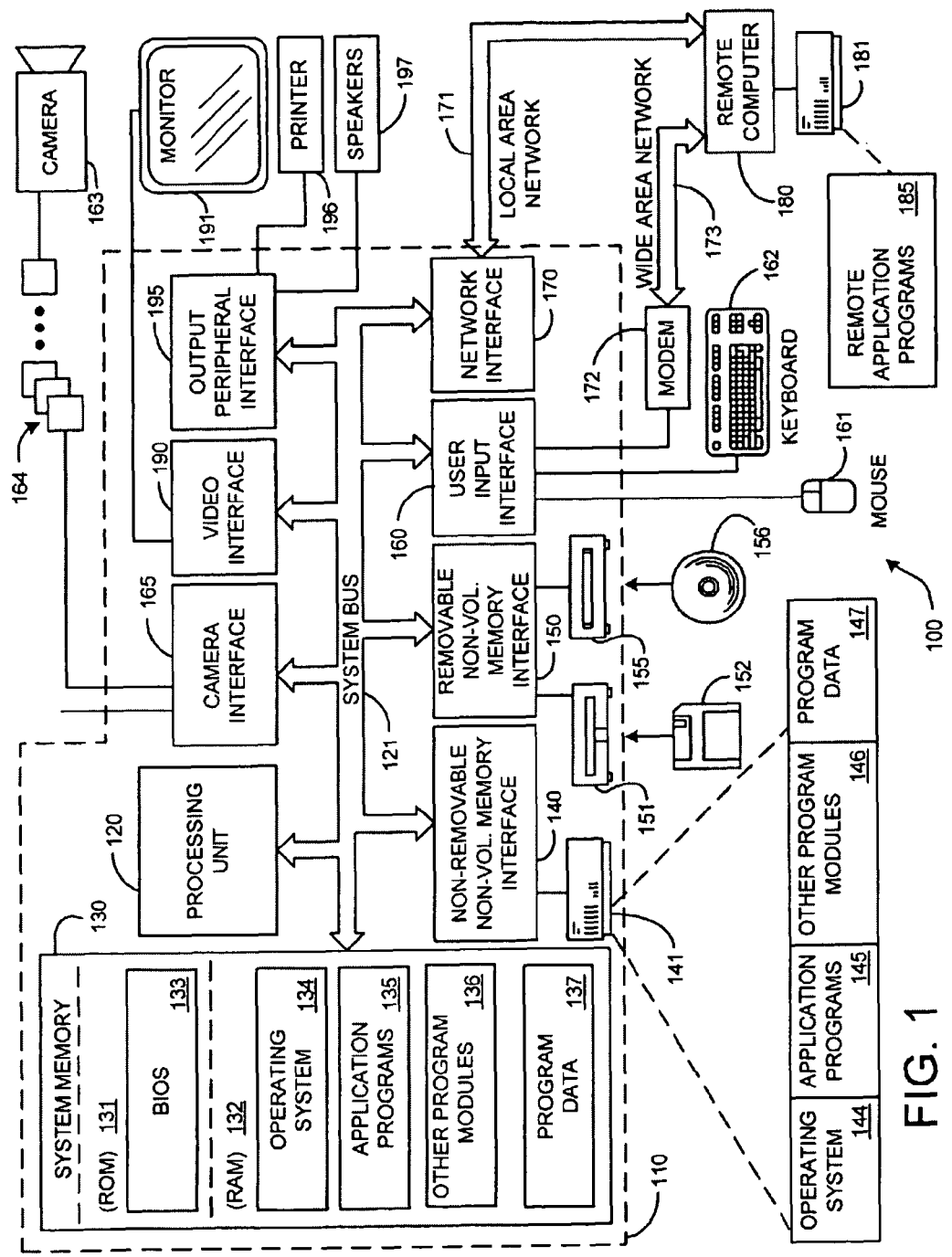
FIG. 1 is a diagram depicting a general purpose computing device constituting an exemplary system for implementing the invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, mobile telephones and other mobile devices, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that performs particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available physical media that can be accessed by computer 110 and includes both volatile and nonvolatile media, removable and non-removable media. By way of example, and not limitation, computer readable media may comprise physical computer storage media. Computer storage media includes both volatile and nonvolatile, removable and non-removable media implemented in any physical method or technology for storage of information such as computer readable instructions, data structures, program modules, or other data. Computer storage media includes, but is not limited to, physical devices such as, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information and which can be accessed by computer 110.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 141 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156 such as a CD ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. A camera 163 (such as a digital/electronic still or video camera, or film/photographic scanner) capable of capturing a sequence of images 164 can also be included as an input device to the personal computer 110. Further, while just one camera is depicted, multiple cameras could be included as an input device to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks such as mobile networks for handheld and other such mobile devices. Such networking environments are commonplace in offices, enterprise-wide computer networks, intranets, and the Internet and are used in both static and mobile environments.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

2.0 A System and Method for Human Answerable PICPVIs

The exemplary operating environment having now been discussed, the remaining parts of this description section will be devoted to a description of the program modules embodying the invention. The following sections provide an overview of the system and method according to the invention and various embodiments thereof.

2.1 System Overview

Figure 2:
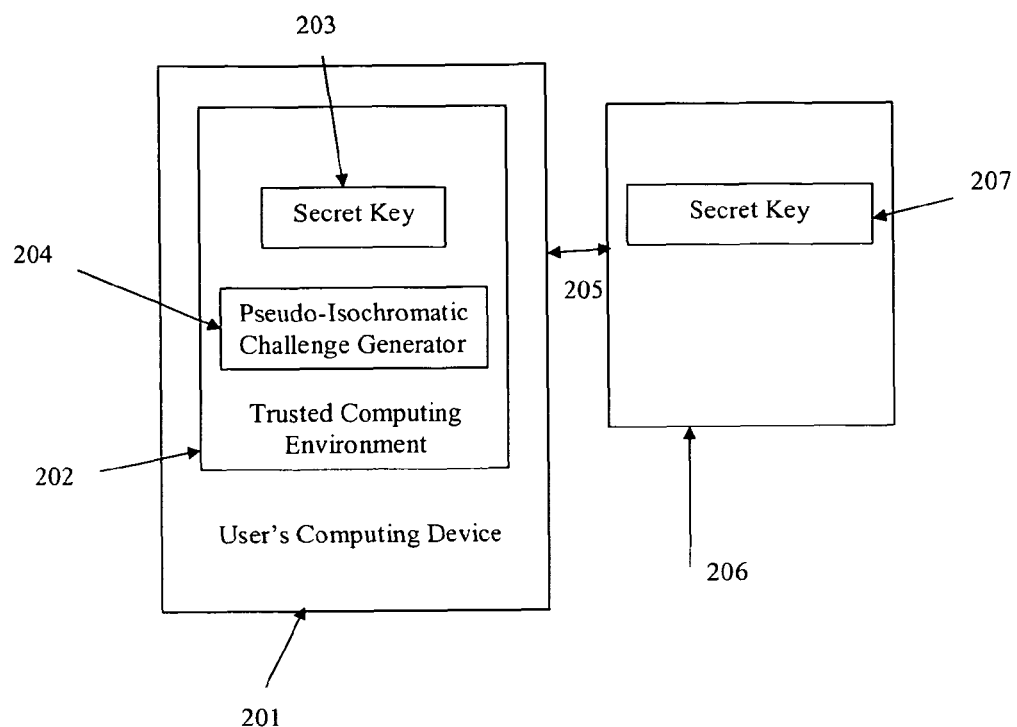
FIG. 2 is a simplified schematic of the system according to, but not limited to, one embodiment of the invention.

One embodiment of the system according to the invention is shown in FIG. 2. As shown in FIG. 2, a user's computing device 201 includes a trusted computing environment or device 202 that includes a secret key 203 and PICPVI generator 204. The trusted computing environment/device 202, secret key 203 and PICPVI generator 204 are discussed in greater detail below. The user (e.g., the user's computing device 201) can send a request for service that may include various information such as, for example, message content, date, time, a sender's name/address, the recipient's name/address, an answer to a challenge generated by the PICPVI generator, and so on, as well as a digital signature attesting that the user's trusted environment or device generated and sent the request for service to the service provider 206. This message is typically sent over a network 205. The service provider 206 evaluates the user's request using the digital signature to verify the message content and the user's trusted computing environment's identity. In one embodiment, the service provider can also optionally verify the user's answer to the PICPVI using a secret key 207 that is the same as the user's. In this case a shared key would be used. However, either shared-key (symmetric) or public key (asymmetric) conventional encryption techniques could be used to encrypt the message containing the user's request and digital signature. With shared keys the trusted device (or a third party) share a different secret key with each service provider. This key is used to encrypt the answer and attestation which the service provider can decrypt with the same key. In the asymmetric approach the key has two pieces: a private key held by the service provider, and a public key available to the trusted environment/device (or trusted third party). Encryption in this case is performed with the public key, and decryption with the private key.

2.1.1 Trusted Computing Environment or Trusted Device

Various trusted computing environments and trusted devices can be used with the system and method according to the invention. Many trusted computing environments and devices of various forms are known. For this application, a trusted computing environment is a module capable of storing and computing with data not available to the computer user. For example, one known trusted computing environment is Microsoft®. Corporation's Next Generation Secure Computing Base (NGSCB). NGSCB employs hardware and software to enable secure computing capabilities to provide enhanced data protection, privacy, and system integrity. NGSCB transforms a PC into a platform that can perform trusted operations spanning multiple computers under a trust policy that can be dynamically created and whose integrity anyone can authenticate. NGSCB includes strong process isolation where users can wall off and hide pages of main memory so that certain applications can be assured that they are not modified or observed by any other application or even the operating system. NGSCB also includes sealed storage. Information can be stored in such a way that only the application from which data is saved (or a trusted designated application or entity) can open it. NGSCB also includes a secure path to and from the user. Secure channels allow data to move safely from the keyboard/mouse to certain applications, and for data to move from these applications to a region of the screen. NGSCB also ensures that users have the ability to authenticate software or a combination of software and hardware. In this authentication, a piece of code can digitally sign or otherwise attest to a piece of data and thus assure the recipient that the data was constructed by an unforgeable, cryptographically identified trusted software stack.

A smart card is another trusted device that can be employed with the system and method according to the invention. A smart card is a card, often the size and shape of a credit card, that contains a computer chip and is used to store and/or process information. For example, a smart card can be used with the invention as follows. The user's computer provides information about the sender to the smart card device. The smart card then issues a PICPVI based on the information from the user. The user answers the challenge, providing it to the smart card, and the smart card sends the user's information and "signed statement" stating that the user/sender can be trusted if the receiving device, in this case the service provider, trusts the user's trusted computing environment or device. Other trusted devices may include a USB dongle or a USB memory plug.

Figure 3:
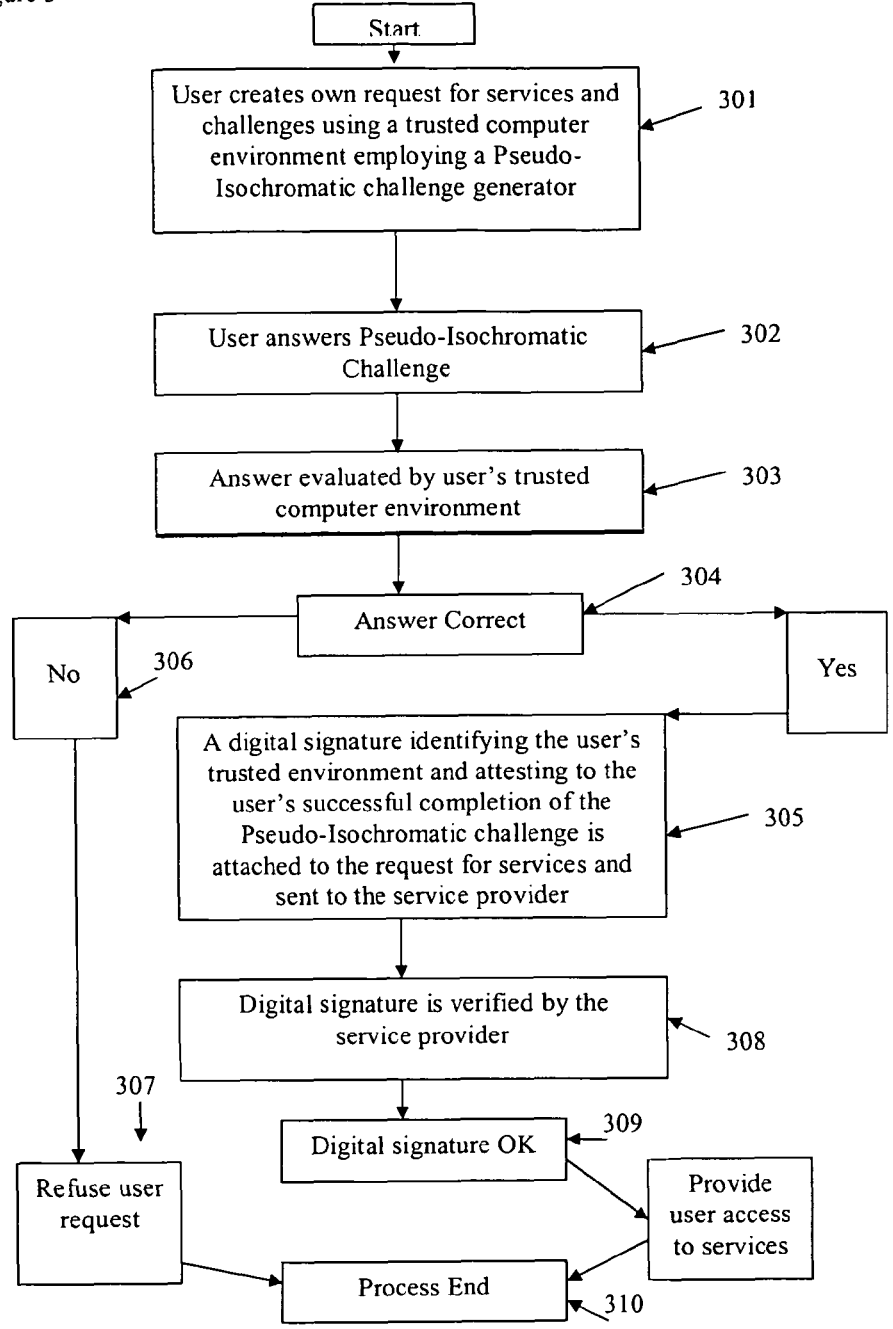
FIG. 3 is a simplified flow diagram for generating, answering and verifying a PICPVI according to one embodiment of the invention wherein the user's trusted computing environment or device verifies the user's answer to the PICPVI.

2.2 Embodiment Wherein a Trusted Environment/Device Issues the PICPVI and the User's Answer is Verified by the User's Trusted Environment The process actions of one embodiment of the invention are shown in FIG. 3. A user wishing to request a particular service from a service provider creates their own PICPVI using the user's computer trusted environment and information from the user's request for services (process action 301). The user then answers the PICPVI providing the answer to the user's trusted computing environment (process action 302). The user's trusted computing environment then evaluates the user's answer to the PICPVI, and if the answer is correct, generates a digital signature attesting to the successful completion of the challenge which is attached to the user's request for services and sent to the service provider (process actions 303, 304, 305); else the user's request is discarded (process actions 306 and 307). The digital signature can also be used to authenticate the identity of the sender of the message, in this case the user's trusted device, and to ensure that the original content of the message or document that has been sent is unchanged. Typically this digital signature is message specific and hence is tied to a particular message. Once the service provider receives the user's message, the digital signature is verified by the service provider (process action 308). As mentioned above, various methods of encryption, decryption, and the authentication methods, such as a digital signature verification, can be used in conjunction with the invention. In verification of the user's message, in one embodiment of the invention, the service provider determines whether the signed statement matches the message, and whether the device that generated the digital signature is trustworthy. In this embodiment, in determining whether the signed statement matches the message the service provider's mail client checks to ensure that the signed statement matches the message being sent. To perform this action the service provider's mail client takes the message and other information about the message and performs a cryptographic hash against the digital signature via conventional methods. In determining whether the service provider trusts the user's trusted computing environment the service provider uses the digital signature. For example, in one embodiment, each trusted device or trusted computing environment has a certificate signed by a third party that verifies that the device is trusted by the third party. The trusted device or environment presents the certificate to the recipient's mail client which uses it to determine if it is a trustworthy device. If the digital signature is acceptable, the service provider processes the user's request for services and provides the user access to their services (process actions 309, 310). Otherwise the user's request is discarded (process action 307).

Figure 4:
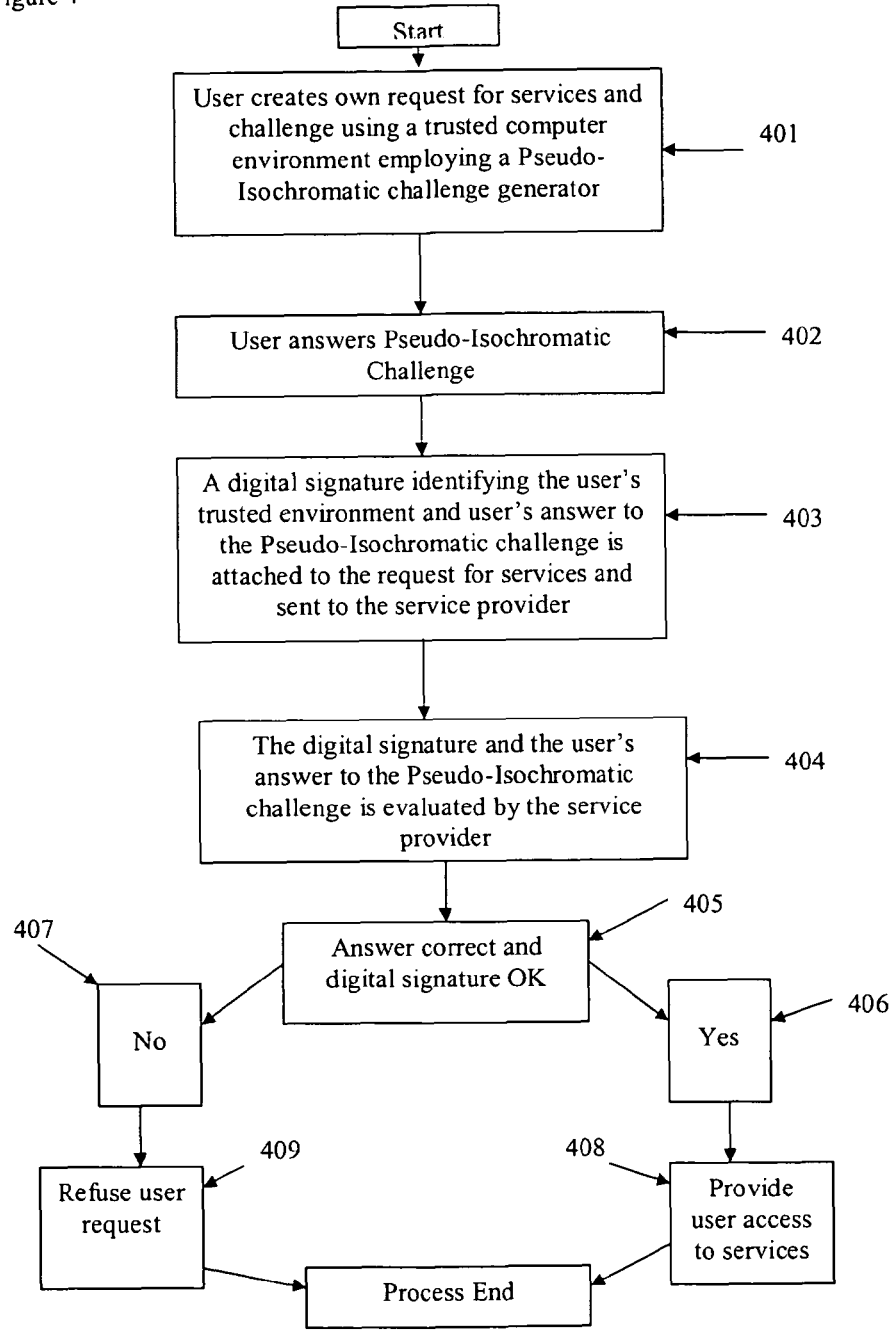
FIG. 4 is a simplified flow diagram for generating, answering and verifying a challenge according to one embodiment of the invention wherein the service provider verifies the user's answer to the challenge.

2.3. Embodiment wherein the Trusted Environment Issues the PICPVI and the Challenge Answer is Evaluated by the Service Provider The process actions of another embodiment of the invention that is similar to that discussed and shown in FIG. 3, are shown in FIG. 4. In this embodiment the user's answer to the PICPVI is evaluated by the service provider instead of the user's trusted computing device. A user wishing to request a particular service creates its own PICPVI using its trusted environment and information from the service request message (process action 401). The user then answers the challenge (process action 402). The trusted computing environment then generates a digital signature that includes or is appended to the user's answer to the challenge as well as the correct answer to the challenge encrypted in a form that can be decrypted by the service provider and attaches this to the user's request for services that is sent to the service provider (process action 403). Once the service provider receives the user's message, the digital signature and the user's answer to the challenge can then be verified by the service provider (process action 404). If the digital signature and answer are acceptable, the service provider provides the user access to their services (process actions 405, 406, 408), otherwise the user's request for service is discarded (process actions 407, 409). It should be noted that variations of this embodiment as related to verification of the user's answer are possible. For instance, the signed message can include the user's answer and the correct answer. Alternately, the signed message can include only the correct answer and the service provider can verify the user's answer by comparing it to the correct answer. Alternately, the signed assertion can include no correct answer, and the trusted computing environment can verify the answer itself and assert that the PICPVI has been successfully completed. If the PICPVI is not successfully completed another series of PICPVIs may be generated to counter human visual perception deficiencies. Additionally, instead of the trusted computing environment or device forwarding the response the service provider, the trusted computing environment or device could provide the signed message back to the user to forward to the service provider as part of a request for services.

2.4 Variations of the Embodiments Above Wherein the Trusted Computing Environment is Provided by the Service Provider The above-discussed embodiments can also be supplied by the service provider implementing a PICPVI as a result of a user request for access to services and may be embodied in a variety of systems and methods for the generation of challenges in relation to HIPs.

2.5 Variations of the Embodiments Above Wherein the Trusted Computing Environment or Device is Replaced with a Trusted Third Party The above-discussed embodiments can also be implemented by replacing the trusted computing device or environment with a trusted third party A trusted third party is a party that both the user and the service provider trust. In these embodiments, the trusted third party performs the functions of the user's trusted computing environment or device.

Likewise, the embodiment shown in FIG. 4 can also be implemented using a trusted third party instead of a trusted computing device or trusted computing environment.

2.6 PICPVI Generator

Various challenge generators are known in the area of HIPs. A challenge generator generates a challenge that is issued to the user to determine whether the user is a human, or a computer program such as an automated script. Challenges allow one party to gain assurances that the identity of another is as declared, thereby preventing impersonation of humans by machines. The invention within this system is incorporated within a challenge generator that we have identified as Pseudo-Isochromatic in format.

In response to the occurrence of a restricted event in a computing device, a user of the computing device is presented with a challenge or puzzle including information designed to assist in determining whether the challenge or puzzle is answered by a human. The system and method of the invention provides for presenting challenges or puzzles utilising the Pseudo-Isochromatic techniques currently used to test for colour blindness but not limited to colour as black, white and greyscale may also be used. The invention is known as a PICPVI.

If it is determined that the challenge or puzzle was not answered or not answered correctly, perhaps due to a human deficiency in colour perception, a secondary challenge, which may take the form of 1 or more separate challenges or puzzles presented as alternatives or together forming the whole, may be, but does not have to be, invoked. Challenges may also serve a dual purpose. For instance, the service provider may use the results of the PICPVI to automatically generate appropriate individualised end user colour schemes whereby information including security features in what are known as "traffic light" systems (e.g. green address bar in a browser indicates valid SSL certificate) can be changed to correspond with the users visual needs and the end user can opt to establish an automatically generated end user environment colour scheme. The PICPVI generator may be set to issue any number of challenges before failure to answer would result in the restricted event being counteracted and no further challenges are issued in that session.

The challenge will be in the form of letters, numbers, geometric shapes or pictures of recognizable objects, animals, or people presented in a Pseudo-Isochromatic style which can be defined as a pattern of dots or shapes which may be uniform or variable in size, in different colours, saturations, contrasts and colour hues which when perceived by the human eye are recognizable but are designed in such a way as to make OCR and other automated processes and computer vision techniques, not limited to those previously described, extremely difficult. The visual image may be further obscured by skewing or with the addition of strategically or randomly placed geometric lines, shapes or pictures.

A Pseudo-Isochromatic visual challenge may comprise an image based visual illusion, textual or numerical puzzle, or any combination of these, in any language or script, and is designed to be easily solved by a human but extremely difficult to solve by an automated process. The method and style of the challenge described herein may be utilised and integrated within a variety of processes and applications but is not limited to those described.

A computer implemented process used to generate a short sequence of alphanumeric characters or a picture which can, for example, then be rendered into a visual image made up of a number of randomly generated linked and unlinked dots or shapes in various colours and colour saturations or hues displayed on a human distinguishable background of similar, the whole, comprising a human visible illusion, presented in various colour hues that is given to the user as a challenge and yet the shapes, letter, numbers are indiscernible by automated processes. Similarly, images made up of multiple dots, shapes or lines, in either greyscale or colours, and saturations, presented on a background of similar nature that renders the challenge or puzzle detail indiscernible by automated processes.

Upon successful completion of the challenge, the computing environment or device digitally signs an assertion that the challenge has been successfully answered and the questioned process or event proceeds to the next stage. Failure to complete the challenge or puzzle will secure the system.

2.6.1. Examples and Composition of PICPVIs

Figure 5:
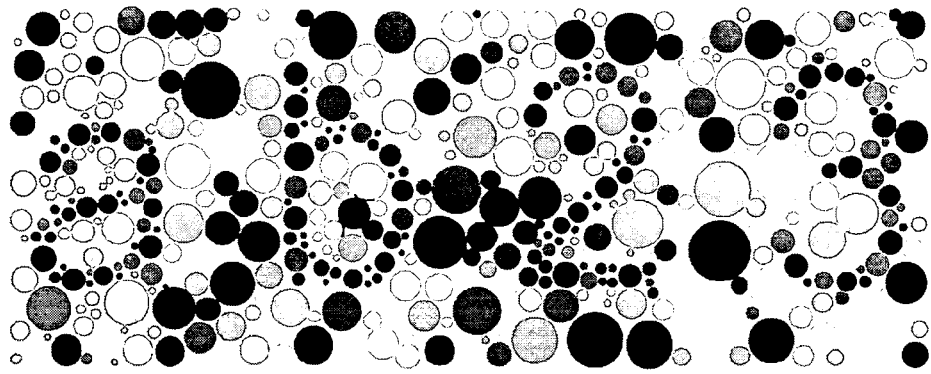
FIGS. 5 to 9 show example Pseudo-Isochromatic challenge or puzzle or any other visual illusion generated on the basis of Pseudo-Isochromatic imagery in various states of development.

FIG. 5 shows a detailed enlarged example of an alphanumeric PICPVI that has been created with a standard font with first the letters and digits filled using a vector based graphics program and then the background filled.

Figure 6:
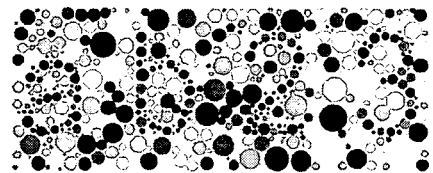

FIG. 6 shows FIG. 5 as it would appear to the end user as a PICPVI.

Figure 7:
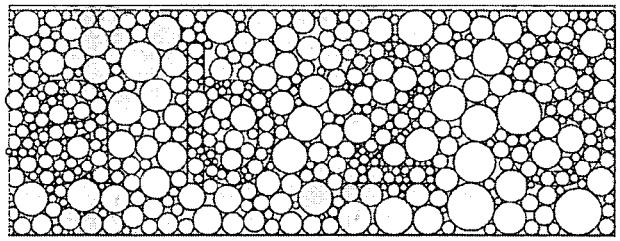

FIG. 7 shows how FIG. 5 was compiled using a vector based graphic program and shows the outline of the font before a Pseudo-Isochromatic fill is applied.

Figure 8:
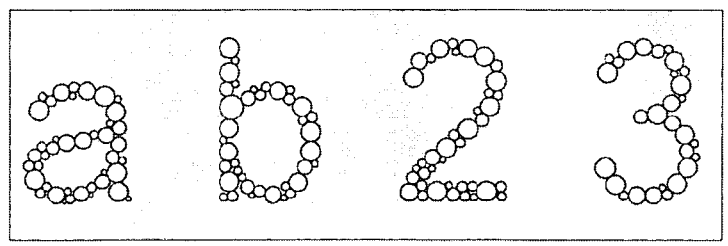

FIG. 8 shows the underlying alphanumeric challenge as generated with a Pseudo-Isochromatic fill technique applied but before grey-scale, colour or background is added.

Figure 9:
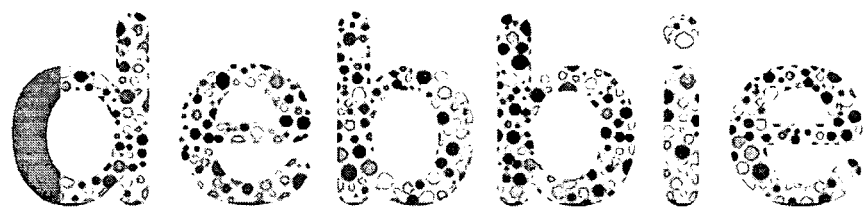

FIG. 9 shows an example of an alpha-numeric PICPVI created using a Pseudo-Isochromatic layer applied to a font but with no background.

The invention claimed is:

1. A computer-implemented process for determining whether a computer user is a human or a computer program, by generating a Pseudo-Isochromatic challenge or puzzle or any other visual illusion generated on the basis of Pseudo-Isochromatic imagery (PICPVI), comprising the process actions of: generating a request for services of a service provider at a user's computing device; generating a PICPVI at a user's computing device comprising the actions of: the user generating a preliminary request for services message to said service provider; generating a cryptographic randomized hash value using data from said preliminary request for services message; and using said cryptographic randomized hash value to generate the PICPVI; the user answering the challenge; a computing device evaluating the user's answer to the challenge and attaching a form of authentication if the user's answer is correct; sending a request for services including the form of authentication, digital signature at any alternatives from the user to a service provider; the service provider evaluating the user's request for services and authentication method used; and the service provider determining whether to allow the user access to the service provider's services based on the evaluation of the authentication process or any digital signature which may include a secret key.

2. The computer-implemented process of claim 1 wherein the user's computing device comprises a trusted computing environment comprising a PICPVI generator.

3. The computer-implemented process of claim 2 wherein the answer to the PICPVI is used to generate the authentication method used or digital signature.

4. The computer-implemented process of claim 3 wherein the authentication method used identifies and authenticates the user's trusted device and message data.

5. The computer-implemented process of claim 3 wherein the message data includes the user's answer to the challenge.

6. The computer-implemented process of claim 1 wherein a cryptographic hash value or any other generation method is used to generate a short sequence of alphanumeric characters or shapes which is rendered into a Pseudo-Isochromatic visual image or illusion that the user is to identify.

7. The computer-implemented process of claim 1 wherein the cryptographic hash value is used to generate a sequence of alphanumeric characters or general shapes which are rendered into a visual image using the principles of human visual perception related Pseudo-Isochromatic techniques, herein described as a PICPVI, for the user to identify.

8. The computer-implemented process of claim 7 where the PICPVI is created by the use of, but not limited to, a Pseudo-Isochromatic font with computer generated foreground and background, a specifically designed font, with random font fill in Pseudo-Isochromatic style with no discernible boundaries or edges or other computer aided shape generation process resulting in the visual presentation of a PICPVI and further: comprising modules of a computer program to: verify the user's answer to the challenge; and if the user's answer is correct, allow the user access to services provided by the service provider or device.

9. A computer-implemented process for determining whether a computer user is a human or a computer program, by generating a Pseudo-Isochromatic challenge or puzzle or any other visual illusion generated on the basis of Pseudo-Isochromatic imagery (PICPVI), and for determining whether to allow a computer user access to a service provider's services, comprising the process actions of: generating a PICPVI at a user's computing device for the user using a trusted computing device resident on the user's computing device comprising the actions of the user generating a preliminary request for services message to said service provider: generating a cryptographic hash or any other generation method using data from said preliminary request for services message; and using the cryptographic hash or other such method to generate a PICPVI; the user answering the challenge; sending a request for services including an authentication method, that the challenge has been successfully answered; the service provider evaluating the user's request for services and any digitally signed assertion; and the service provider determining whether to allow said user access to the service provider's services based on the evaluation of said user's request for services and any digitally signed assertion or other authentication method.

10. The computer-implemented process of claim 9 wherein the trusted computing device reports back to the user a partial authentication method or digital signature, and wherein the remainder of the authentication method or digital signature is rendered as a challenge or puzzle.

11. The computer-implemented process of claim 10 wherein the user computes the remainder of the partial signature.

12. The computer-implemented process of claim 11 wherein the user's answer to the challenge when combined with the given portion of the authentication method used, such as a digital signature forms the authentication or digitally signed assertion.

13. The computer-implemented process of claim 9 wherein said PICPVI is generated using information extracted from the end user's request for services.

14. The computer-implemented process of claim 13 wherein the information extracted from said user's request for services includes one or more of, but not limited to: message content; date; time; a sender's name; the sender's address and/or IP address; the recipient's name; the recipient's address; and an answer to a PICPVI generated by the PICPVI generator.

15. A computer-implemented process for determining whether a computer user is a human or a computer program, by generating a Pseudo-Isochromatic challenge or puzzle or any other visual illusion generated on the basis of Pseudo-Isochromatic imagery (PICPVI), and for determining whether to allow a computer user access to a service provider's services, comprising the process actions of: generating a PICPVI for a user at the user's computing device using a trusted computing device resident on the user's computing device by generating a cryptographic hash value or other value of information that is extracted from a message the user generates requesting services from a service provider, wherein the cryptographic hash value or other value is rendered into a string of alphanumeric characters or shapes that are presented as a visual image using colour or greyscale variation within Pseudo-Isochromatic techniques as said challenge to the user; the user answering the challenge; the user receiving a digitally signed assertion or other authenticated assertion; the user sending a request for services including a digitally signed assertion or other authenticated assertion that the challenge has been successfully answered; said service provider evaluating said user's request for services and digitally signed or other assertion; and said service provider determining whether to allow said user access to said service provider's services based on said evaluation of said user's request for services and any digitally signed or other assertion.

16. The computer-implemented process of claim 15 wherein said Pseudo-Isochromatic visual image is displayed in such a way as to be not easily recognizable by an optical character recognition (OCR) program or other automated process or computer script.

17. A computer-implemented process for determining whether a computer user is a human or a computer program, by generating a Pseudo-Isochromatic challenge or puzzle or any other visual illusion generated on the basis of Pseudo-Isochromatic imagery (PICPVI), and for determining whether to allow a computer user access to a service provider's services, comprising the process actions of: a user generating a preliminary request for services message to a trusted computing device resident at a trusted third party: generating a PICPVI for the user that comprises a partial digital signature or other partial authentication process using the trusted computing device resident at the trusted third party by; generating a cryptographic hash or other generated value using data from said preliminary request for services message; and using said cryptographic hash or generated value to generate said challenge; the user answering the PICPVI to complete the authentication process or digital signature; the user sending a request for services including the completed authentication method or digital signature to a service provider; said service provider evaluating said user's request for services and the authentication or digital signature used; and said service provider determining whether to allow said user access to said service provider's services based on said evaluation of said user's request for services and the digital signature or any other authentication process used.

18. The computer-implemented process of claim 17 wherein the user's computing device computes the portion of the digital signature or authentication method necessary to complete the partial digital signature or authentication process.

19. A computer-implemented process for determining whether a computer user is a human or a computer program, by generating a Pseudo-Isochromatic challenge or puzzle or any other visual illusion generated on the basis of Pseudo-Isochromatic imagery (PICPVI), comprising the process actions of: generating a request for services of a service provider at a users computer or other network device; generating a challenge at a trusted third party and providing it to said user comprising the actions of: generating a cryptographic hash value or other value using data from the request for services; and using said cryptographic hash value or other value to generate said PICPVI; the user answering the challenge; said trusted third party evaluating said user's answer to the challenge and attaching a digital signature or other authentication method thereto if said user's answer is correct; sending said request for services including said digital signature or authentication method from the trusted third party to a service provider; said service provider evaluating said user's request for services and digital signature or any other authentication method used; and said service provider determining whether to allow said user access to said service provider's services based on said evaluation of said digital signature or authentication method.

20. A computer-implemented process for determining whether a computer user is a human or a computer program, by generating a Pseudo-Isochromatic challenge or puzzle or any other visual illusion generated on the basis of Pseudo-Isochromatic imagery (PICPVI), and for determining whether to allow a computer user access to a service provider's services, comprising the process actions of: a user generating a request for services of a service provider and sending said request to a third party; said third party generating a challenge for the user comprising the actions of generating a cryptographic hash or other value using data from the request for services; and using said cryptographic hash or other value to generate said challenge in the form of a Pseudo-Isochromatic visual image; the user answering the challenge and sending said answer to said third party; sending the user's request for services including a digital signature or other authentication method identifying the third party and the user's answer to the service provider; said service provider evaluating said user's answer and digital signature or authentication method; and said service provider determining whether to allow said user access to said service provider's services based on said evaluation of said user's answer and digital signature or other authentication method.

21. A computer-implemented process for determining whether a computer user is a human or a computer program, by generating a Pseudo-Isochromatic challenge or puzzle or any other visual illusion generated on the basis of Pseudo-Isochromatic imagery (PICPVI), and for determining whether to allow a computer user access to a service provider's services, comprising the process actions of: a user generating a request for services of a service provider and sending said request to a trusted third party; said third party generating a PICPVI comprising the actions of: generating a cryptographic hash value or other value using data from the request for services; and using said cryptographic hash or other value to generate said PICPVI; said third party providing the challenge to the user; the user answering the challenge and providing the answer to said trusted third party; sending the request for services including a digitally signed or any other type of assertion that the challenge has been successfully answered to a service provider; evaluating said request for services and any assertion; and said service provider determining whether to allow said user access to said service provider's services based on said evaluation of said assertion.

22. A non-transitory computer-readable information recording medium having computer-executable instructions for determining whether a computer user is a human or a computer program, by generating a Pseudo-Isochromatic challenge or puzzle or any other visual illusion generated on the basis of Pseudo-Isochromatic imagery (PICPVI), comprising program modules for: generating a request for services of a service provider at a user's computing or mobile device; generating a PICPVI at a user's computing device, comprising the actions of: the user generating a preliminary request for services message to said service provider; generating a cryptographic hash value or other value using data from said preliminary request for services message; and using said cryptographic hash or other such value to generate said PICPVI; the user answering the challenge; said user's computing device evaluating said user's answer to the challenge and attaching a keyed hash or other such value thereto if said user's answer is correct; sending said request for services including said keyed hash or any other value used from the user to a service provider; said service provider evaluating said user's request for services and keyed hash or other value; and said service provider determining whether to allow said user access to said service provider's services based on said evaluation of said keyed hash or other value provided.

23. The computer-readable medium of claim 22 wherein the user's computing device comprises a trusted computing environment comprising a PICPVI generator.

24. The computer-readable medium of claim 22 wherein said keyed hash or other value identifies and authenticates the user's trusted device and message data.

25. The computer-readable medium of claim 22 wherein the message data includes the user's answer to the PICPVI.

26. The computer-readable medium of claim 22 wherein the cryptographic hash or other value used is used to generate a short sequence of alphanumeric characters or shapes which is rendered into a Pseudo-Isochromatic visual image that the user is to identify.

27. The computer-readable medium of claim 22 wherein said service provider's determination of whether to allow said user access to said service provider's services is used for one of, but not limited to: accessing a service or network, assigning an email account; validating an input in a poll; validating a request for access to a service, using a search engine; using a chat room; and accessing data on a website or private network, or making changes to local or global computing environments.

28. A computer-implemented process for determining whether a computer user is a human or a computer program, by generating a Pseudo-Isochromatic challenge or puzzle or any other visual illusion generated on the basis of Pseudo-Isochromatic imagery (PICPVI), comprising the process actions of: generating a request for services of a service provider at a user's computing device; the service provider generating a PICPVI at a user's computing device comprising the actions of: the user generating a preliminary request for services message to said service provider; the service provider generating a cryptographic randomized hash value or other value using data from said preliminary request for services message; and using said cryptographic randomized hash value or other value to generate the PICPVI and sending it to the user; the user answering the challenge and returning completed challenge to the service provider for evaluation; a computing device evaluating the user's answer to the challenge; the service provider evaluating the user's request for services and answer to the challenge; and the service provider determining whether to allow the user access to the service provider's services based on the evaluation of the challenge which may or may not include a digital signature and/or a secret key.

29. The computer-implemented process of claim 28 wherein the service providers computing device comprises a computing environment comprising a PICPVI generator.

30. The computer-implemented process of claim 29 wherein the PICPVI is generated by the service provider and conveyed to the user.

31. The computer-implemented process of claim 30 wherein the user's answer to the PICPVI identifies the user as a human.

32. The computer-implemented process of claim 28 wherein the cryptographic hash value or other value is used to generate a short sequence of alphanumeric characters or shapes which is rendered into a Pseudo-Isochromatic visual image that the user is to identify.

33. The computer-implemented process of claim 28 wherein the service provider's determination of whether to allow the user access to the service provider's services is used for but not limited to: allowing access to a service or network, assigning an email account; validating an input in a poll; using a search engine; using a chat room; and accessing data on a website such as a bank, or private network services, or making changes to local or global computing environments.

34. The computer-implemented process of claim 28 wherein the cryptographic hash value or other value is used to generate a sequence of alphanumeric characters or general shapes which are rendered into a visual image using the principles of human visual perception related Pseudo-Isochromatic techniques, herein described as a PICPVI, for the user to identify.

35. The computer-implemented process of claim 34 where the PICPVI is created by the use of, but not limited to, a Pseudo-Isochromatic font with computer generated foreground and background, a specifically designed font, with random font fill in Pseudo-Isochromatic style with no discernible boundaries or edges or any other computer aided shape generation process resulting in the visual presentation of a Pseudo-Isochromatic style challenge whether it be alpha-numerical or picture based, and further: comprising modules of a computer program to: verify the user's answer to the challenge; and if the user's answer is correct, allow the user access to services provided by the service provider, device or network.

\* \* \* \* \*